(12) United States Patent
Toye

(10) Patent No.: US 9,883,637 B2
(45) Date of Patent: Feb. 6, 2018

(54) CROP PROTECTION NETTING

(75) Inventor: Jonathan Dallas Toye, Auckland (NZ)

(73) Assignee: Nine IP Limited, Auckland (NZ)

( * ) Notice: Subject to any disclaimer, the term of this patent is extended or adjusted under 35 U.S.C. 154(b) by 607 days.

(21) Appl. No.: 13/820,461

(22) PCT Filed: Sep. 2, 2011

(86) PCT No.: PCT/NZ2011/000180
§ 371 (c)(1),
(2), (4) Date: May 9, 2013

(87) PCT Pub. No.: WO2012/030237
PCT Pub. Date: Mar. 8, 2012

(65) Prior Publication Data
US 2013/0219783 A1  Aug. 29, 2013

(30) Foreign Application Priority Data
Sep. 2, 2010 (NZ) ........................................ 587761

(51) Int. Cl.
*A01G 13/02* (2006.01)
*A01G 13/04* (2006.01)

(52) U.S. Cl.
CPC ......... *A01G 13/0206* (2013.01); *A01G 13/02* (2013.01); *A01G 13/043* (2013.01)

(58) Field of Classification Search
CPC ................ A01G 13/02; A01G 13/0268; A01G 13/0275; A01G 13/0281; A01G 13/04; A01G 13/043

USPC .......... 47/31; 442/2, 182, 184, 203, 204, 208
See application file for complete search history.

(56) References Cited

U.S. PATENT DOCUMENTS

| | | | | |
|---|---|---|---|---|
| 4,472,086 A | * | 9/1984 | Leach | 405/302.7 |
| 4,844,969 A | * | 7/1989 | Chang | 5/186.1 |
| 5,965,467 A | * | 10/1999 | Stevenson et al. | 442/218 |
| 6,818,571 B1 | * | 11/2004 | Pintz et al. | 442/2 |
| 8,652,602 B1 | * | 2/2014 | Dolla | 428/36.1 |
| 2004/0266291 A1 | * | 12/2004 | Pintz | 442/2 |
| 2006/0032133 A1 | * | 2/2006 | Tuoriniemi et al. | 47/72 |
| 2006/0258247 A1 | * | 11/2006 | Tao et al. | 442/301 |
| 2012/0090229 A1 | * | 4/2012 | Toye | 47/31 |

FOREIGN PATENT DOCUMENTS

| | | | | |
|---|---|---|---|---|
| AU | 34723/89 B | 11/1989 | | |
| AU | 10254/95 A | 7/1995 | | |
| DE | 19503459 C1 | 5/1996 | | |
| EP | 473438 A1 | * 3/1992 | ............ | A01G 13/02 |
| JP | 01104118 A | * 4/1989 | ............ | A01G 13/02 |
| JP | 05091823 A | * 4/1993 | ............ | A01G 13/02 |
| JP | 2004229564 A | 8/2004 | | |
| JP | 2007202551 A | * 8/2007 | | |
| JP | 2013201906 A | * 10/2013 | | |
| SU | 825723 A1 | 4/1981 | | |

(Continued)

*Primary Examiner* — David J Parsley
(74) *Attorney, Agent, or Firm* — Lowe Graham Jones PLLC

(57) ABSTRACT

Crop protection netting for covering trees or other plants for insect or bird exclusion is of a knitted mesh construction, including knit intersections in the netting and connecting yarn portions between the yarn intersections which extend substantially linearly between intersections. The netting is lightweight and stretchable in multiple directions.

22 Claims, 14 Drawing Sheets

(56) References Cited

FOREIGN PATENT DOCUMENTS

| WO | WO 2007059345 A2 * | 5/2007 | ............. A01G 13/02 |
| WO | 2010/120201 A2 | 10/2010 | |
| WO | 2010/120201 A3 | 10/2010 | |

* cited by examiner

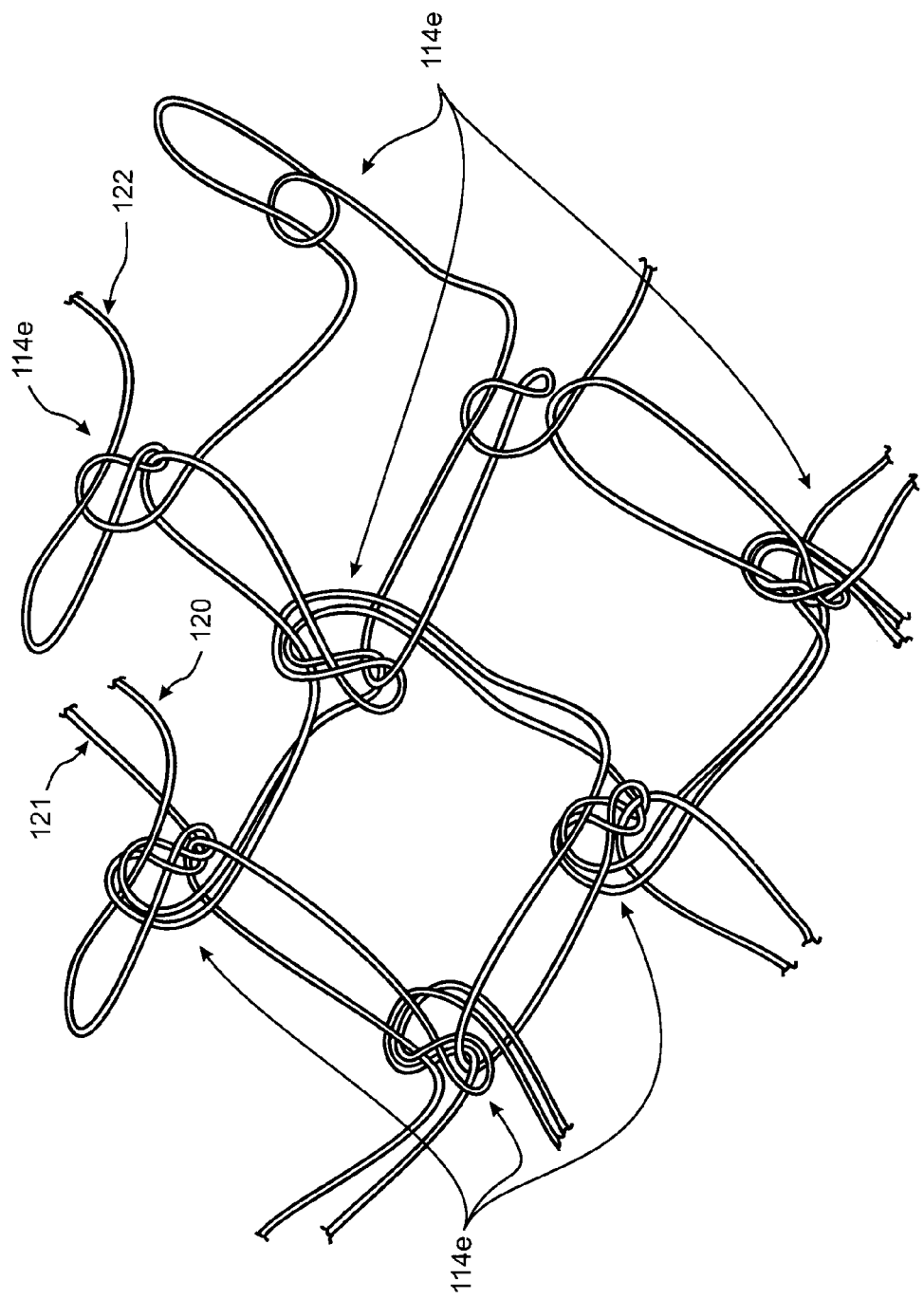
FIGURE 5.1

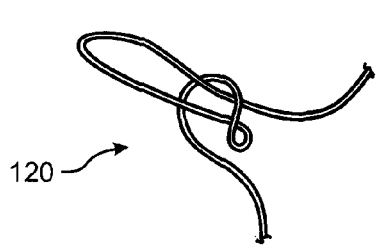 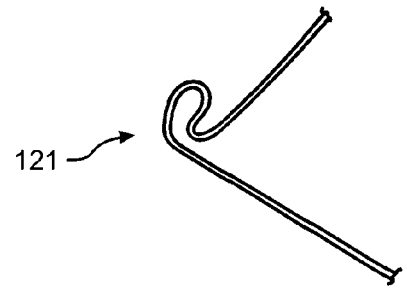
FIGURE 6.1A  FIGURE 6.1B
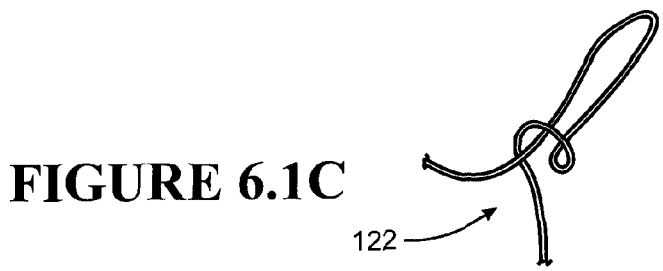
FIGURE 6.1C
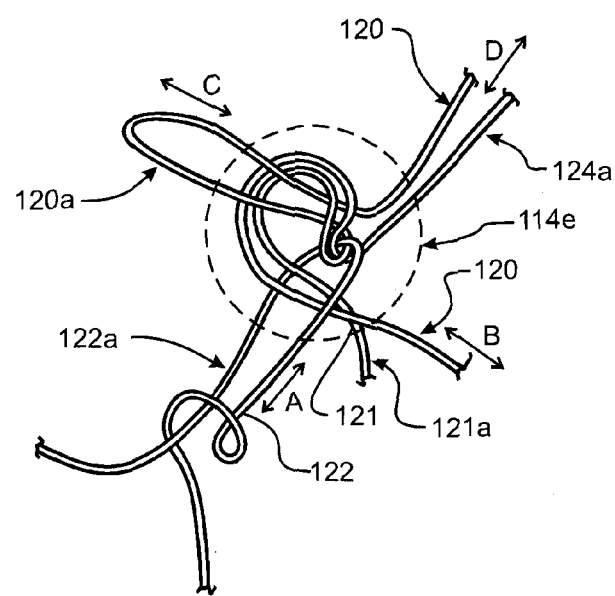
FIGURE 6.1D

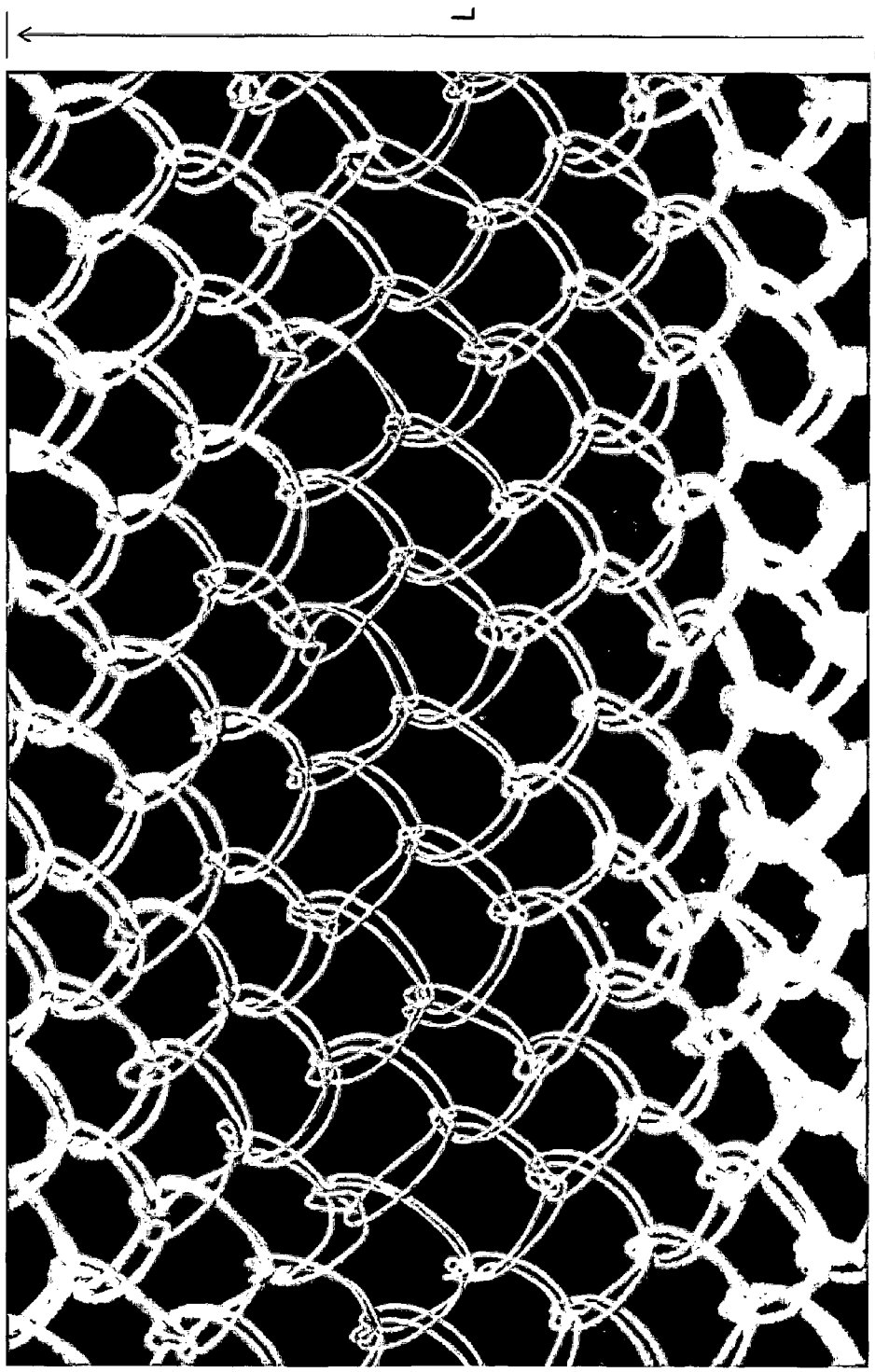
FIGURE 7.1

CROP PROTECTION NETTING

This is a national stage application in the United States of International Application No. PCT/NZ2011/000180 filed 2 Sep. 2011, which claims priority to New Zealand application no. 587761 filed 2 Sep. 2010, the entire disclosures of which are incorporated herein by reference.

FIELD OF THE INVENTION

The present invention relates to crop protection netting for use over growing plants, vines, bushes, or trees (herein: plants) in agricultural applications.

BACKGROUND TO THE INVENTION

Crop protection netting may be used to cover crops while they are growing. One type of crop protection netting comprises a line knit construction with joining filaments as shown in FIG. 8. Another type of crop protection and comprises knitted netting defining diamond shaped apertures as shown in FIG. 9 with the netting yarn on all sides of the netting mesh apertures being continuously knitted or knotted.

SUMMARY OF THE INVENTION

It is an object of the present invention to provide an improved or at least alternative crop protection netting.

In a first aspect the invention broadly comprises crop protection netting having a greater length than width and which is of a knitted mesh construction, knitted such that at yarn intersections in the netting multiple yarns of which the netting is formed are knitted around each other to define the netting mesh apertures so that the netting is stretchable in multiple directions, and wherein connecting yarn portions between said yarn intersections extend substantially linearly between intersections.

Preferably the netting is knitted from multiple yarns all extending along a length of the netting. In a preferred form each yarn follows an approximate zig-zag path path along the length of the netting, looping at each intersection in the netting comprising the yarn, to a further netting yarn intersection one on one side and one on another side.

In another aspect the invention broadly comprises crop protection netting having a greater length than width and which is of a knitted mesh construction, knitted from multiple yarns extending along a length of the netting and following an approximate zig-zag path path along the length of the netting, looping at each intersection in the netting comprising the yarn, to two further netting yarn intersections one on one side and one on another side.

In a preferred netting construction of the invention as will be further described with reference to the accompanying figures, each intersection is formed by knitting together of three yarn parts passing through the intersection:
  a first yarn which enters the intersection along a first axis and exits the intersection along the same first axis, so that a first connecting portion to a first adjacent intersection comprises adjacent lengths of the same yarn,
  a second yarn which enters the intersection along a second axis, passes through the loop within the intersection of the first yarn, and extends to and returns from a second adjacent intersection along a third axis so that a second connecting portion to that adjacent intersection comprises adjacent lengths of the same yarn, and exits the intersection along a fourth axis, and
  a third yarn which enters the intersection along the second axis so that a third connecting portion from a third adjacent intersection comprises portions of both the second and third yarns, passes through the loop in the intersection of the first yarn, and exits the intersection along fourth axis with the second yarn, so that a fourth connecting portion to a fourth adjacent intersection comprises portions of both the second and third yarns.

In another preferred netting constructions of the invention as will be further described with reference to the accompanying figures, each intersection is formed by knitting together of three yarn parts passing through the intersection:
  a first yarn which enters the intersection along a first axis, firstly creates an extra loop and exits the intersection along the same first axis, so that a first connecting portion to a first adjacent intersection comprises adjacent lengths of the same yarn,
  a second yarn which enters the intersection along a second axis, passes through the loop within the intersection of the first yarn, and then goes behind the loop created by the first yarn to create an extra loop and then extends to and returns from a second adjacent intersection along a third axis so that a second connecting portion to that adjacent intersection comprises adjacent lengths of the same yarn, and exits the intersection along a fourth axis, and
  a third yarn which enters the intersection along the second axis so that a third connecting portion from a third adjacent intersection comprises portions of both the second and third yarns, passes through the loop in the intersection of the first yarn, and exits the intersection along fourth axis with the second yarn, so that a fourth connecting portion to a fourth adjacent intersection comprises portions of both the second and third yarns.

And each yarn intersection in the netting is connected to adjacent and surrounding yarn intersections by connecting yarn portions each comprising at least two yarn lengths. Preferably, each yarn intersection in the netting is connected to adjacent and surrounding yarn intersections by connecting yarn portions each comprising at least two yarn lengths that are at least free of knots or loops for 2 mm or more in length between the intersections.

Preferably the netting comprises rows of said yarn intersections adjacent to one another in a first axis or direction across the netting, typically across a machine or manufacturing axis or direction of the netting. Preferably in immediately adjacent rows of yarn intersections in a second direction substantially orthogonal to said first direction, typically a machine or manufacturing axis or direction of the netting, the yarn intersections of the adjacent rows are staggered relative to one another.

Preferably the width of the netting is substantially uniform along the length of the netting.

Preferably the mesh size is in the range of approximately 3 mm to 20 mm, 0.3 mm to 10 mm, more preferably approximately 3 mm to 8 even more preferably 4 mm to 6 mm, even more preferably 3 mm to 5 mm, even more preferably approximately 3.5 mm to 4.5 mm, and most preferably approximately 4 mm.

In one form each mesh aperture comprises four yarn sides between knitted yarn intersections. In a preferred form the lengths of the sides are substantially equal. The netting may alternatively be knitted so that the lengths of the mesh aperture sides are unequal or so that the mesh apertures have more than four sides in more complex mesh aperture shapes, for example but not limited to hexagonal shaped mesh apertures. In the four-sided mesh form of the netting the shape of the apertures may be substantially square, rectangular, triangular, or any other shape. The mesh aperture shape is referred to when the netting is equally and maximally taut but not stretched in both its length and width directions.

In one form the netting is formed from elastic yarn. In another form, the netting is formed from non-elastic yarn. In another form the yarn is formed from yarn that has some elongation when stretched but is neither elastic or non-elastic.

In a preferred form the netting is reflective. In another form the netting is non-reflective. In some embodiments the yarn forming the netting may be any of the following: black, white, transparent or translucent, white (UV or non-UV reflecting white) in colour, coloured, formed from a non-pigmented material, formed from plastic, or formed from a range of polymers.

In one form the netting is formed by twin, triple, or multiple or single monofilament fibre yarns. In one form the yarn is monofilament. Preferably, the monofilament has a substantially circular cross-section. More preferably the yarn has diameter in the range of approximately 0.1 mm to 1 mm, even more preferably 0.2 mm to 0.8 mm, and even more preferably 0.2 mm to 0.4 mm, and more preferably 0.2 to 0.3 mm and most preferably 0.15 mm to 0.25 mm In denier, the yarn is preferably in the range of approximately 50 to 1000 denier, more preferably 50 to 700 denier, even more preferably 100 to 500 denier, even more preferably 100 to 300 denier, even more preferably 150 to 250 denier or even more preferably 200 to 300 denier Typically the netting is machine-knitted for example on a warp knitting machine or a weft insertion warp knitting machine.

Preferably the weight of the netting is in the range of approximately 10 to 100 grams per $m^2$, more preferably 15 to 80 grams per $m^2$, even more preferably 20 to 60 grams per $m^2$, even more preferably 20 to 40 grams per $m^2$, or more preferably 30 to 40 grams per $m^2$ and even more preferably 25 to 35 grams per $m^2$.

In some embodiments the yarn may incorporate a compound or compounds added to cause or increase the extent to which the material reflects and/or absorbs radiation from the earth (terrestrial (long wave or infrared) radiation). Thus when the netting is placed over plants it will assist in retaining heat beneath the material, which may be desirable for some plants or applications.

In some embodiments the yarn may incorporate a compound or compounds added to cause or increase the extent to which the netting allows transmission and/or absorption of radiation from the earth (terrestrial (long wave or infrared) radiation). Thus when the netting is placed over or adjacent to plants it will assist in releasing the heat beneath the netting, which may be desirable for some plants or applications.

In other embodiments the yarn may incorporate a compound or compounds added to cause or increase the extent to which the netting reflects and/or absorbs solar radiation. Thus when the netting is placed over plants it will assist in cooling beneath the material, which may be desirable for some plants or applications.

In other embodiments the yarn may incorporate a compound or compounds added to cause or increase the extent to which the netting allows transmission and/or absorption of solar radiation. Thus when the material is placed over plants it will assist in increasing the heat beneath the material, which may be desirable for some plants or applications.

In a further aspect the invention broadly consists in a method of protecting plants comprising the step of at least partially covering a plant or row of plants with a crop protection netting of the first aspect of the invention.

In one form the step of covering the plant(s) comprises securing the netting over the entirety of the plant(s) and securing or fixing it to the ground surface surrounding the plants.

In another form the step of covering the plant(s) comprises suspending or supporting the netting over the top of the plant(s) as a canopy using a supporting structure or framework.

The term "yarn" as used in this specification, unless the context suggests otherwise is intended to mean multi or mono filament yarn, threads or fibres. The term "yarn" unless the context suggests otherwise, is intended to include longitudinally extending single filament elements having four sides when viewed in cross-section, such as a rectangular or square cross-section, also longitudinally extending elements having a multisided cross-section such as a triangular or hexagonal cross-section for example, and also longitudinally extending elements having a circular or oval or similar cross-section (sometimes referred to hereafter as monofilament). The yarns may be formed from any suitable polyolefin such as polyethylene or polypropylene, for example, or a mixture thereof, or an ethylene alpha-olefin, or a polyester, or a biopolymer, or a blend of any of the foregoing. Certain plastics are particularly useful when present as minor or major components. Ethylene vinyl acetate (EVA), ethylene butyl acrylate (EBA) and ethylene methyl acrylate (EMA) are useful for imparting elasticity and other properties. Polyesters and polystyrene, styrene-butdienie (SB), acrylonitrile-butadienie-styrene (ABS), styrene-aciylonitrile (SAN), polyethylenie terephithialate (PET), polymethylmethacrylate (PMMA) and polycarbonate are useful as dye carriers and also for influencing radiation (reflecting, absorbing and transmission) properties and also other properties on the materials. Starch and other plant polymers are useful to increase biodegradability. Alternatively the yarns may comprise in part or whole of paper, wood or cellulose fibre, starch based polymers, casein, latex or in any combination of the above and/or with petroleum derived plastic polymers. The polymer or polymer blend may incorporate agents such as one or more pigments, LTV stabilisers, or processing aids.

The phrase "mesh size" as used in this specification, unless the context suggests otherwise, is defined for the four-sided and equal-length sides form of mesh apertures as the length of the sides of the mesh aperture, or a substantially equivalent cross-sectional area for non-equi-length sided mesh apertures or other more complex mesh aperture shapes formed by more than four sides, the cross-sectional area being determined when the netting is taut but not stretched in both directions.

The term "reflective" as used in this specification is intended to mean that the netting filament or yarn themselves, excluding the air spaces, is reflective of at least 20%, or 30%, or 40%, or 50% or alternatively at least 55% or alternatively at least 60% of visible light on at least one side of the netting. In one embodiment of a reflective netting, the netting may reflect at least 40% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm. The netting may reflect more solar radiation than it transmits and absorbs in the UV, visible, and very near infrared ranges. The material may transmit at least 15% or at least 20% of solar radiation on average in the wavelength range about 800-2500 nm. Some or all yarn of a reflective netting may be formed from a resin comprising a white pigment, which resin has been formed by mixing a masterbatch consisting essentially of 20 to 90% by weight of a white pigment or combination of pigments chosen from zirconium, strontium, barium, magnesium, zinc and calcium pigments, and a first polymer, with a second polymer such that the resin (masterbatch) comprising the white pigment comprises between about 5 to 50% by weight of the total mixture. In certain embodiments the white pigment may be selected from zirconium, dioxide, magnesium, zirconate, calcium zirconate, strontium zirconate, barium zirconate, zirconium silicate, zinc sulphide, calcium carbonate, barium sulphate, magnesium oxide, strontium carbonate, barium carbonate, potassium titanate and titanium dioxide.

The term "cover factor" means the percentage of the overall area of the netting material which comprises knitted, woven, or non-woven monofilament, yarn, or tape or a combination, forming the netting itself, judged from perpendicular to the plane of the netting when laid out flat, as opposed to air space in between the netting. Thus if a netting has a cover factor of 20% then the air space through the netting would be 80% of the total area of the netting.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

BRIEF DESCRIPTION OF THE DRAWINGS

Preferred embodiments of the invention will be described by way of example only and with reference to the drawings, in which:

FIG. 5.1 is a closer view of a small portion of a variation of the crop protection netting with extra looping than shown in FIGS. 6a-6d, and in which three separate monofilament yarns or strands of the netting are shown each in a different shade;

FIGS. 6.1a-c each show the path of a one of the three yarns in an individual intersection in the variation of the crop protection netting with extra looping, and FIG. 6.1d shows enlarged an individual intersection, again with each yarn or strand shown in a different shade as in FIG. 5.1;

FIG. 7.1 is another plan view of a portion of the variation of the crop protection netting of FIGS. 5.1 and 6.1;

DETAILED DESCRIPTION OF PREFERRED EMBODIMENTS

Figure 8:
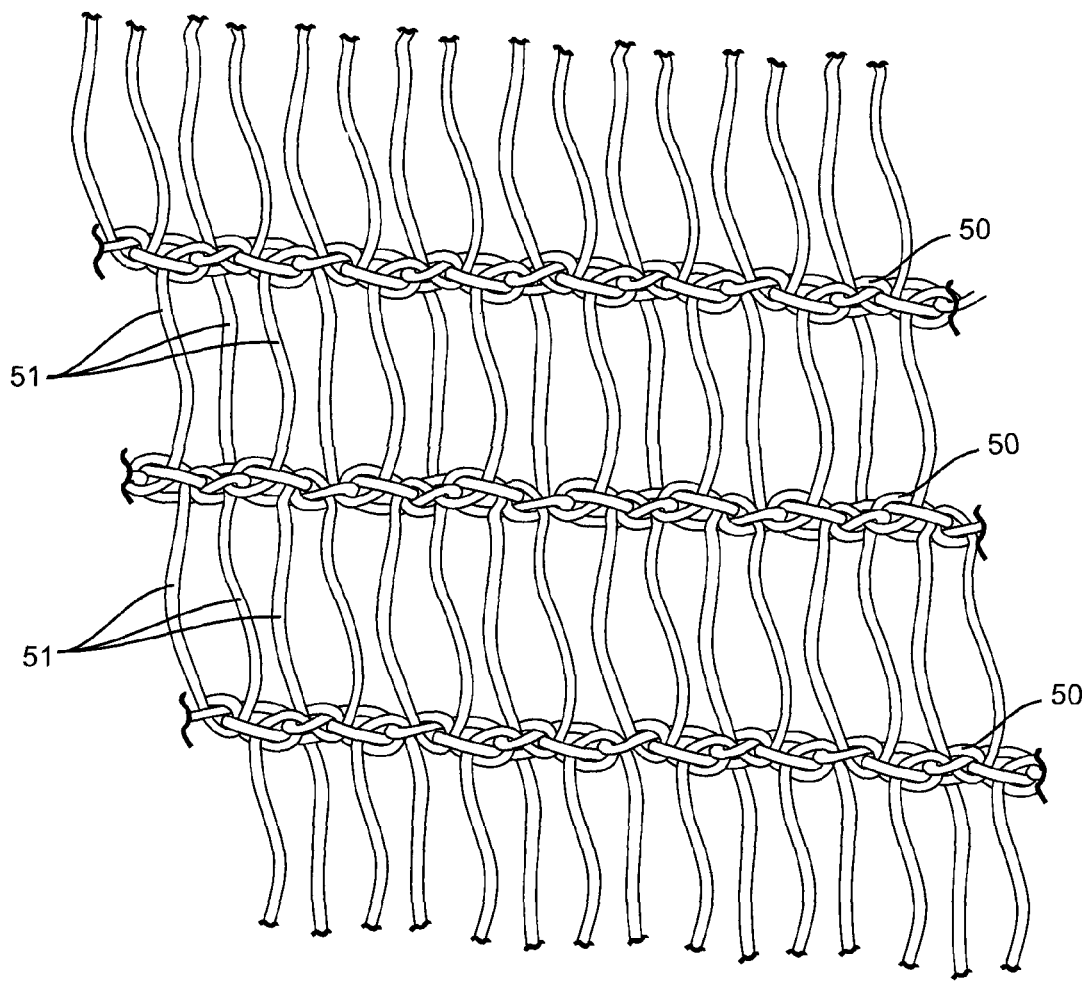
FIG. 8 is a plan view of one prior art netting.

The crop protection netting of the invention is particularly suitable for covering trees or other plants for insect and bird exclusion. Particularly, the crop protection netting may be used over fruit trees including citrus trees to exclude insects that cause pollination in turn producing fruit with seeds. The netting is also stretchable or elongatable in both axes or directions, in the plane of the netting when laid flat, so that as trees or plants covered by the netting grow the netting can stretch to accommodate growth. The netting also does not comprise a relatively high level of knotting in the netting construction, which can add weight to the netting which weight may undesirably bear on often delicate foliage of covered plants. In particular the netting does not comprise lines of knotting formed by knotting the yarn upon itself along these lines, and also the netting yarn on all sides of the netting mesh apertures is not continuously knitted or knotted FIG. 8 shows one type of prior art crop protecting netting of a line knit construction. The netting comprises parallel lines or ribs 50 formed by knotting the yarn upon itself along these lines, which are joined by cross-portions 51 of the yarn. The ribs 50 essentially comprise rows of tight knots. In the knots of the lines 50 the individual yarns are tied to one another and cannot move (or can move only marginally under strong tension). Yarn is knotted at one line 50 and then looped via a cross-portion 51 to the next line 50 then this is repeated down the rib line(s) so that there are two yarns knotted then the next two looped (as part of one loop) and so on. As a result the yarn is non-stretch or elongatable at least in the axis along the ribs. Also the high level of knotting in the lines or ribs 50 makes the netting relatively heavy.

Figure 9:
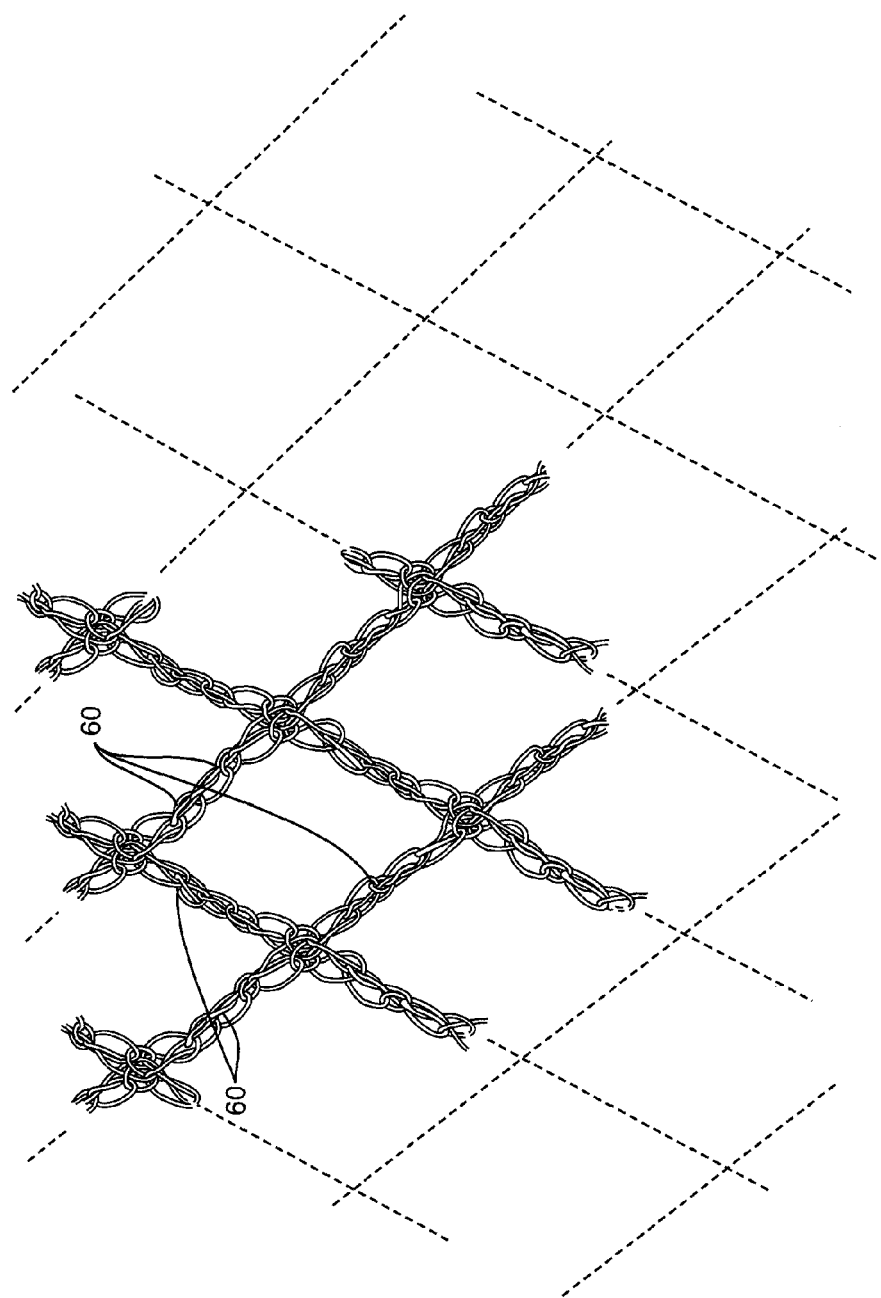
FIG. 9 is a plan view of another prior art netting.

FIG. 9 shows another form of prior art crop protecting netting comprising diamond shaped apertures with the netting lines 60 being knitted or knotted as shown. This netting is also relatively heavy due to the continuous knotting in all directions/along all sides of the diamond shaped apertures. Also the knit construction comprising continuous knotting in all directions/along the netting sides of the diamond shaped apertures inhibits knitting this form of netting with a small aperture size such as a 4 mm aperture size or example and it restricts the weaving of lighter weight netting.

Figure 1:
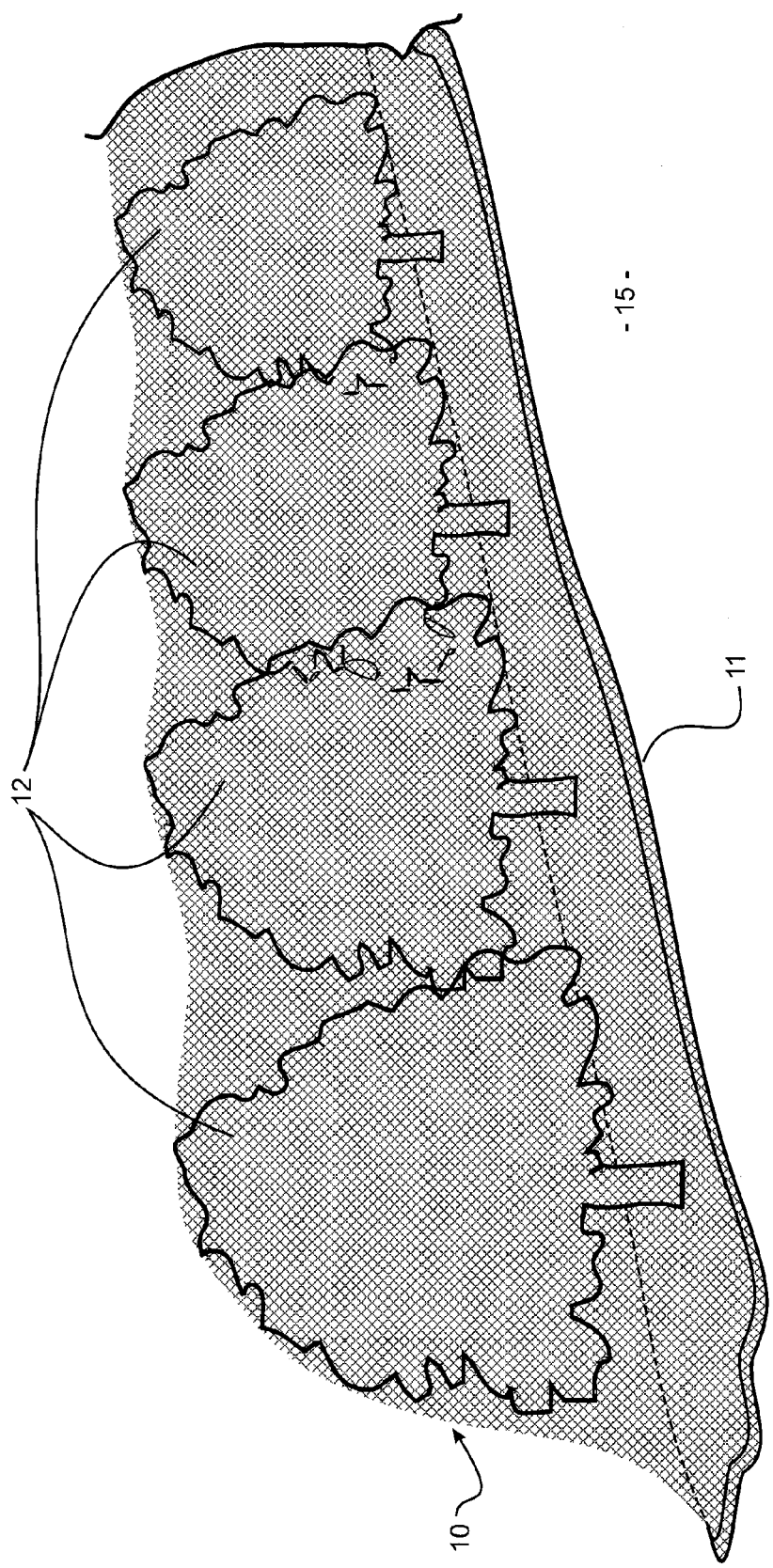
FIG. 1 is a schematic diagram of crop protection netting fully covering an entire row of plants in accordance with an embodiment of the invention.

Referring to FIG. 1, a length of crop protection netting 10 of the invention is shown placed over a row of fruit trees 12. The netting may be manufactured in a length and width to suit typical applications or a range of lengths and/or widths. Typically the width of the netting is between about 2 and 20 meters and the length of the netting is longer. For insect exclusion typically the netting must be large enough to extend over an entire plant or row of plants as shown, and be secured, fastened or anchored at or toward the peripheral edges 11 of the netting with stakes, pegs, soil or other fixing devices to the ground 15 surrounding the periphery of the plant or plants such that bees or other insects cannot fly under the netting into the trees. Alternatively, the edges 11 of the netting may drape onto the ground and need not necessarily be secured in any way other than under its own weight. As shown in FIG. 1, the netting 10 is draped over the trees such that it is in contact with and supported in place by the trees it covers.

Figure 2:
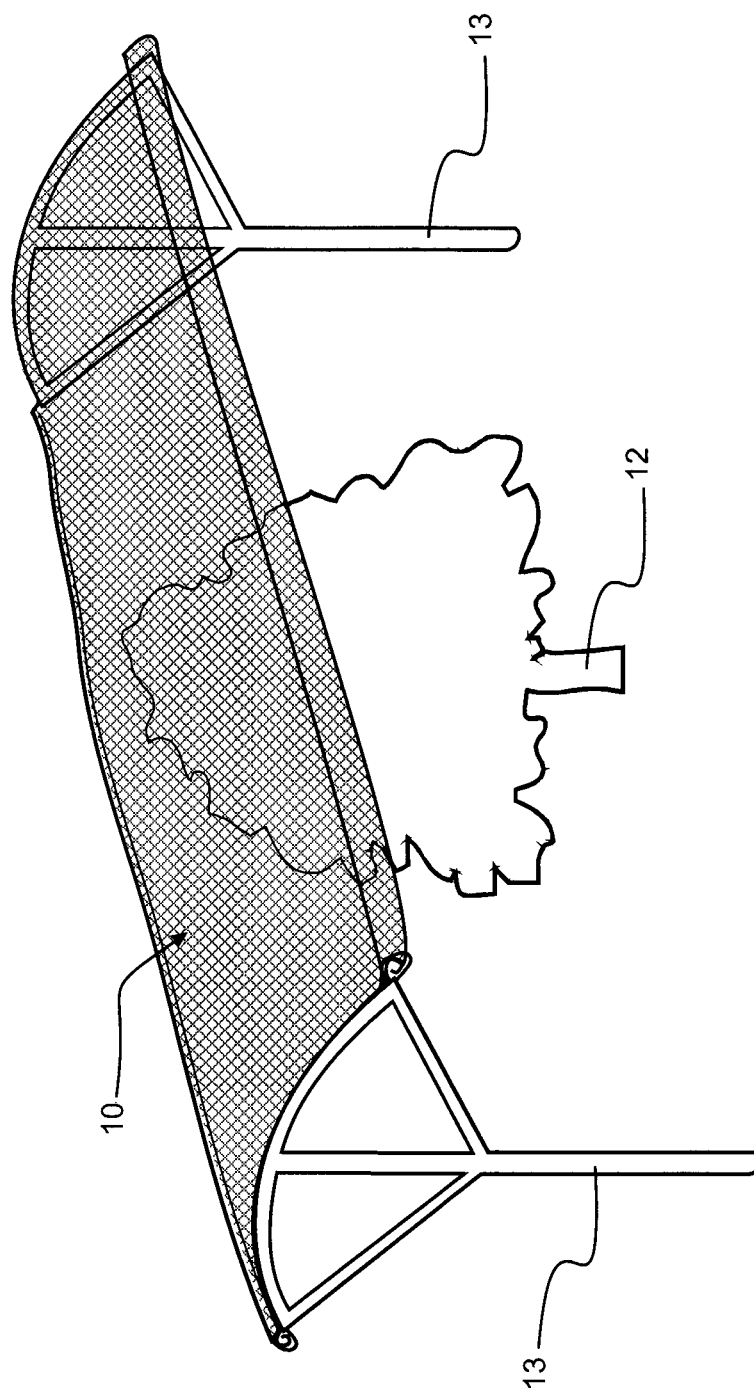
FIG. 2 is a schematic diagram of crop protection netting partially covering a plant in the form of a canopy in accordance with an embodiment of the invention.

FIG. 2 shows an alternative installation of crop protection netting of the invention as a canopy extending over the top of a fruit tree 12, and this installation may be applied over/along a row of trees also. The canopy installation comprises a supporting structure 13 or framework that supports or suspends the netting 10 over the fruit trees. The netting may also be arranged such that its peripheral edges 11 extend at least some way toward the ground 15 if more or full coverage is desired. The supporting structure 13 may comprise one or more upright posts alone or in combination with supporting wire or wires or other cross-members extending between the posts.

Figure 3:
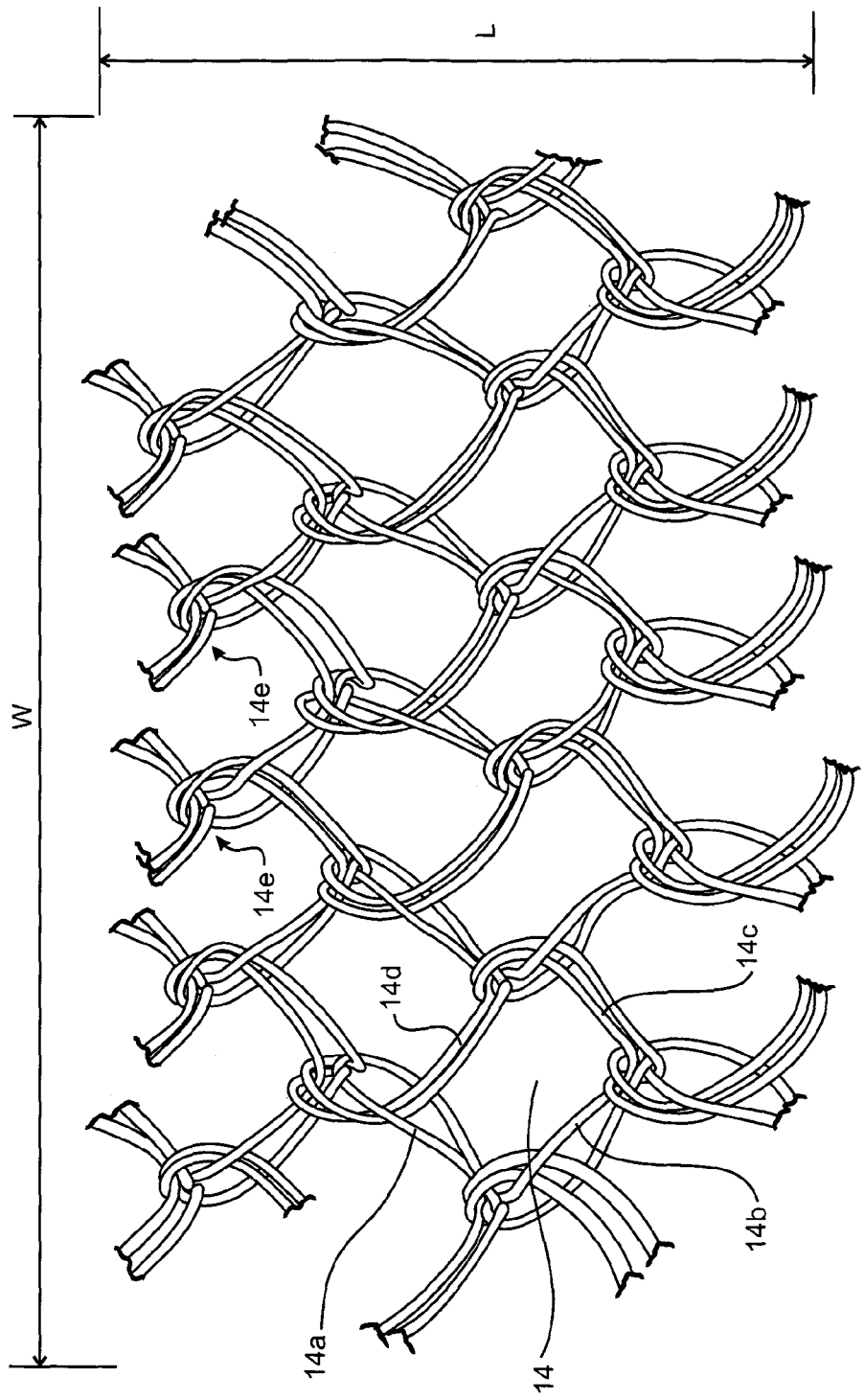
FIG. 3 is a plan view of a portion of the crop protection netting in a taut but un-stretched state in accordance with an embodiment of the invention.
Figure 4:
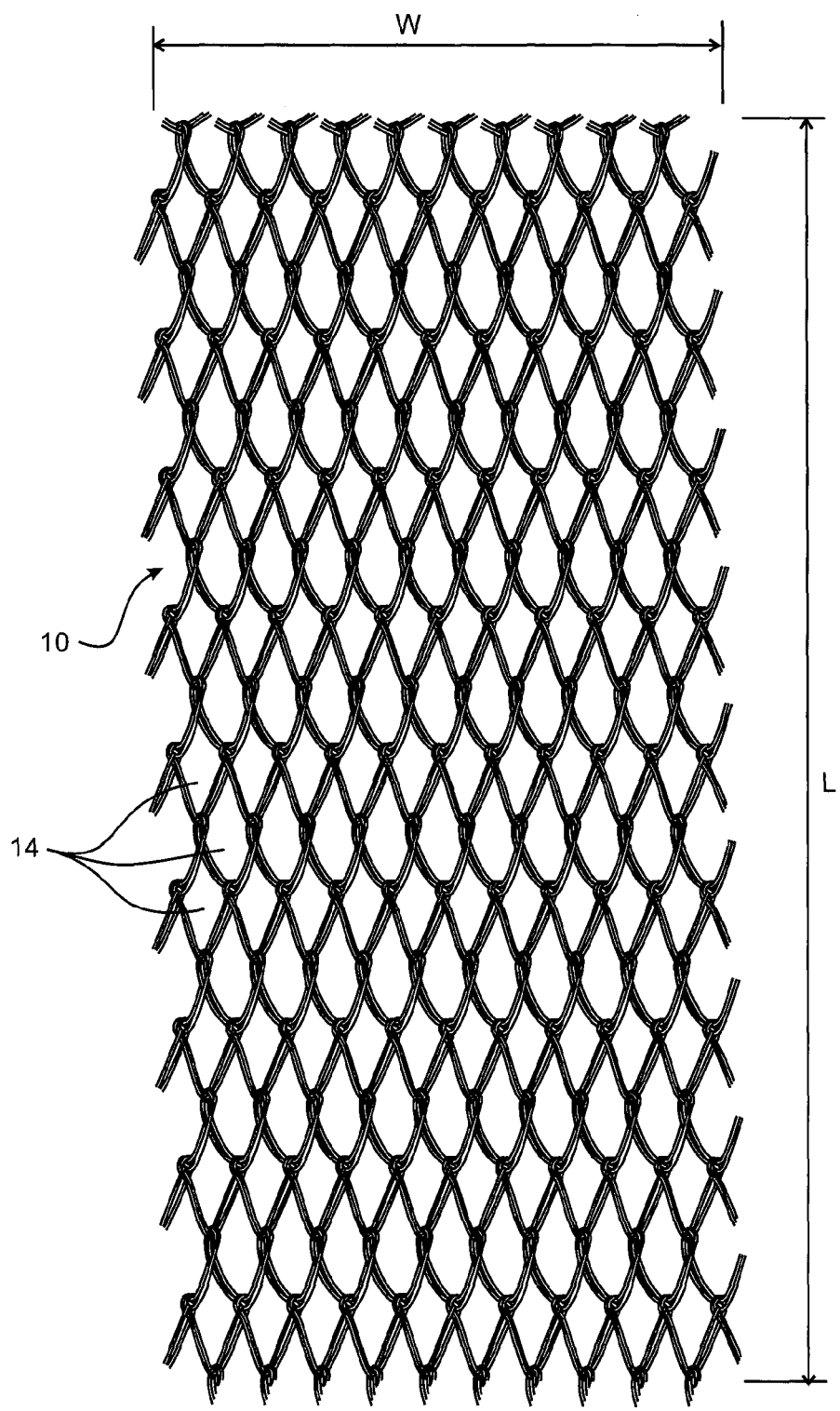
FIG. 4 is a plan view of a portion of the crop protection netting of FIG. 3 that has been stretched outwardly in the direction of arrows L.

FIG. 3 is a plan view of a portion of crop protection netting of a preferred embodiment of the invention in a taut but un-stretched state and FIG. 4 is a plan view of a portion of the netting stretched outwardly in the direction of arrows L. Optionally edge portions (not shown) of the netting may be reinforced or formed with different material to assist in fixing the netting to the ground. As shown, the entire netting or majority of the netting if the edges are reinforced is formed from a knitted mesh construction shown.

Figure 7:
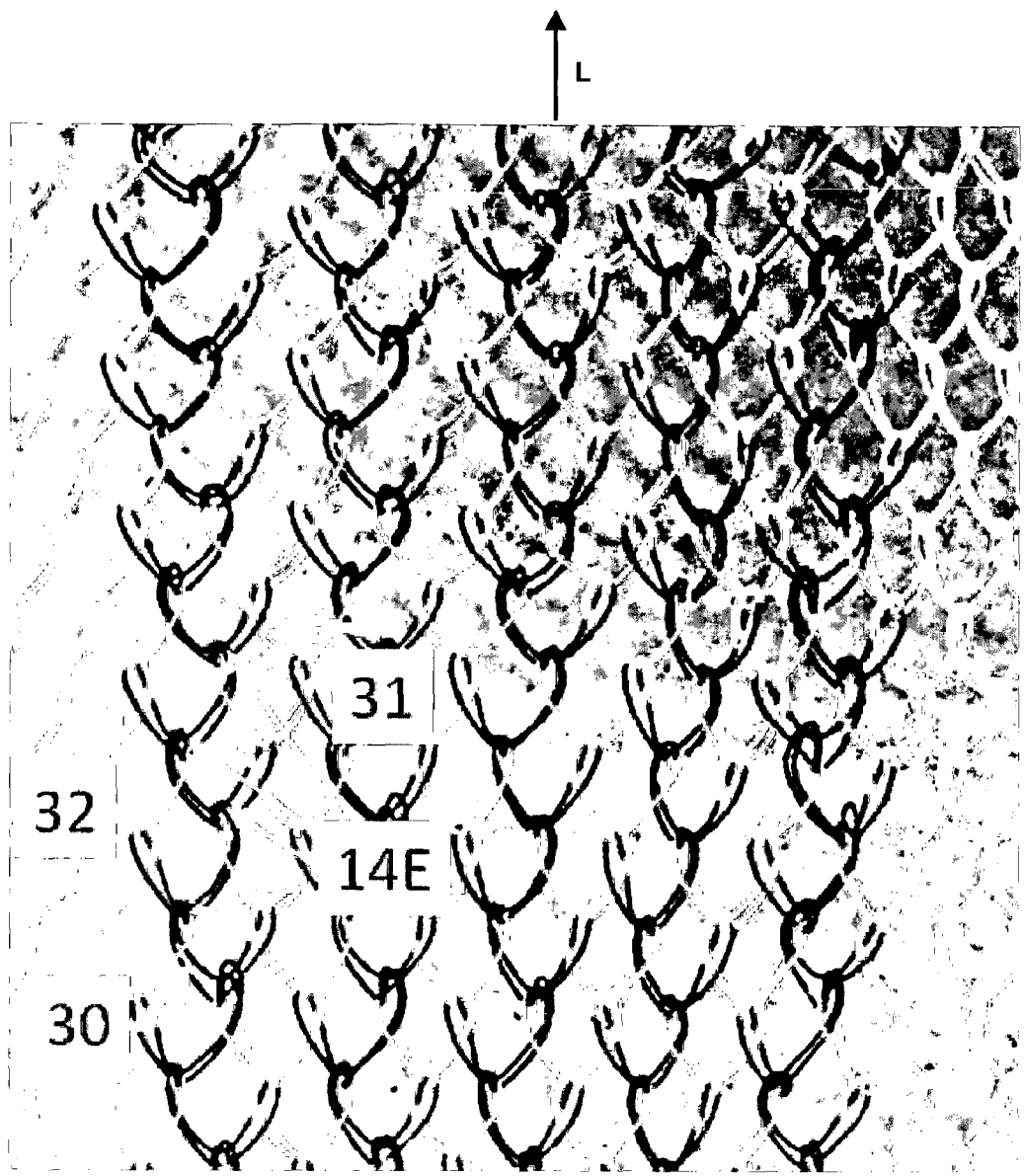
FIG. 7 is another plan view of a portion of the crop protection netting of FIGS. 3-6d.

The netting is typically machine-knitted on a warp knitting machine or other knitting-machine. The netting comprises an array of mesh apertures 14. The mesh apertures 14 of the preferred embodiment are shaped as seen in FIG. 7, a combination of rounded base and pointed peak, forming four sides with four yarn intersections points and are substantially uniform in shape and size. The orientation of the mesh apertures 14 relative to the length L and width W directions of the netting need not be as shown in FIG. 3.

Referring particularly to FIG. 3 each shaped mesh aperture 14 is defined substantially by four sides 14a-14d of substantially equal length of yarn, which are connected by four knit intersections 14e. At the knit intersections 14e the yarns of which the netting is formed are looped around each other. Between the yarn intersections 14e the connecting yarn portions 14a-14d extend substantially linearly and are not continuously knitted or knotted (as in the prior art netting types referred to above). The sides 14a-d may have non-equal lengths in alternative forms of the netting. As shown, the sides 14a-14d between the intersections 14e comprise twin yarns, but be comprised of triple or multiple yarns in alternative embodiments. In the four-sided form of the mesh apertures, the shape of the apertures may be substantially square, rectangular or any other shape. It will also be appreciated that the mesh apertures may be knitted to have more than four sides, and with intersections 14e in alternative forms of the knitted mesh construction to create more complex mesh aperture shapes, for example but not limited to hexagonal shaped apertures.

Figure 4A:
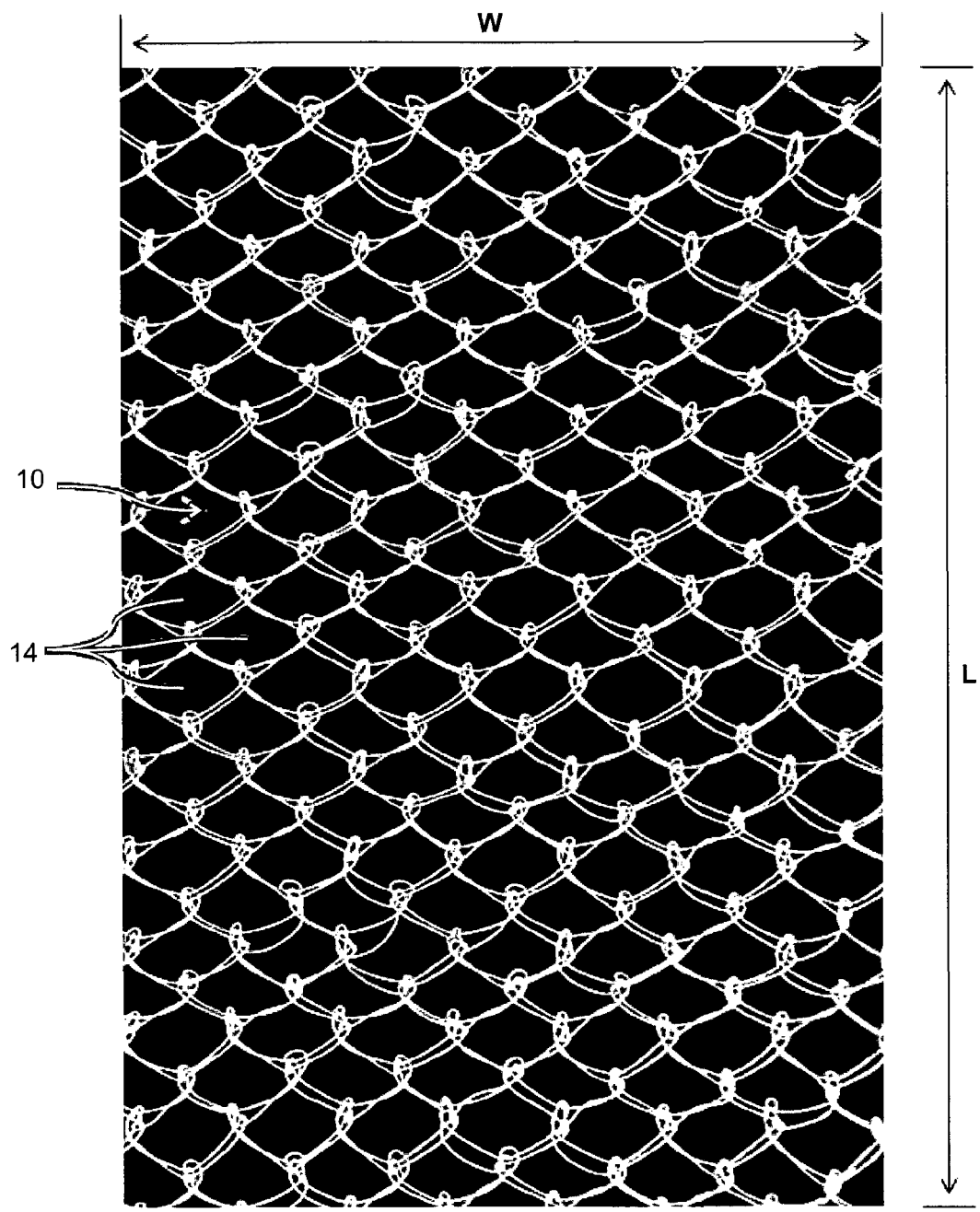
FIG. 4a is a plan view of a portion of the crop protection netting of FIG. 3 that has been stretched outwardly in the direction of arrows L the opposite of FIG. 4.

The netting is stretchable or extendible in both the width axis or direction indicated by arrow W and the length axis or direction indicated by arrow L in FIGS. 3 and 4 which is typically the machine or manufacturing direction. FIG. 4 shows a portion of the crop protection netting of FIG. 3 that has been stretched in the length direction L (causing some contraction or reduction in the width direction W and also causing the mesh apertures 14 to change shape). FIG. 4a shows a portion of the crop protection netting of FIG. 3 that has been stretched in the width direction W (causing some contraction or reduction in the length direction L and also causing the mesh apertures 14 to change shape.

In the preferred embodiment shown the mesh size of the equi-length four sided mesh apertures 14 is defined by the length of the sides 14a-d between the intersections 14e, measured when the netting is in a taut but non-stretched state in both length and width directions. Preferably the mesh size may be in the range of approximately 3 mm to 20 mm, 3 mm to 10 mm, more preferably approximately 3 mm to 8 mm, even more preferably 4 mm to 6 mm, even more preferably 3 mm to 5 mm, even more preferably approximately 3.5 mm to 4.5 mm. In one preferred form for pollinating insect exclusion the mesh size may be approximately 4 mm.

The yarn from which the netting is knitted is typically a monofilament yarn of any suitable material as previously mentioned. Typically, the yarn is extruded from a polymer resin. Each yarn yarns may be single monofilaments, or alternatively may comprise twin or multiple monofilaments. The monofilament yarns may be circular in cross-section or otherwise shaped. For circular monofilament yarns, the yarn preferably has a diameter in the range of approximately 0.1 mm to 1 mm, even more preferably 0.2 mm to 0.8 mm, and even more preferably 0.2 mm to 0.4 mm, and more preferably 0.15 to 0.3 mm and most preferably 0.15 mm to 0.25 mm. In denier (grams per 9000 meters of the yarn) the yarn is preferably in the range of approximately 50 to 1000 denier, more preferably 50 to 700 denier, even more preferably 100 to 500 denier, even more preferably 100 to 300 denier, even more preferably 150 to 250 denier or most preferably 200 to 300denier. The monofilament yarn may be stretchable or non-stretchable in length, and may be elastic or non-elastic depending on requirements. The netting is relatively lightweight. The weight of the netting is preferably in the range of approximately 10 to 100 grams per $m^2$, more preferably 15 to 80 grams per $m^2$, even more preferably 20 to 60 grams per $m^2$, even more preferably 20 to 40 grams per $m^2$, even more preferably 30 to 40 grams per $m^2$ and even more preferably 25 to 35 grams per $m^2$ and most more preferably 30 to 40 grams per $m^2$ The crop protection netting may have a cover factor (as herein defined) of less than 30%, less than 20%, less than 10%, or less than 5%.

Figure 5:
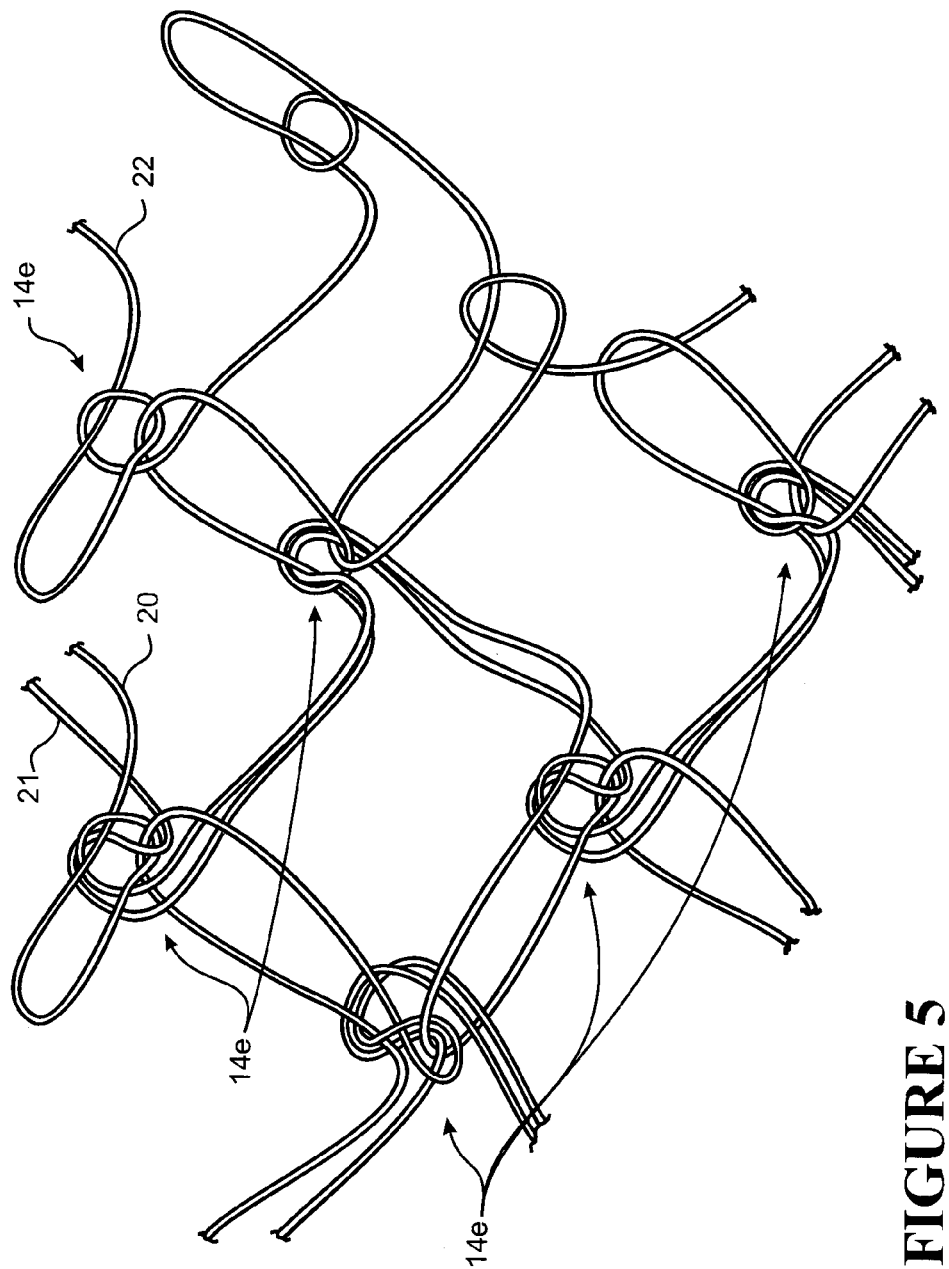
FIG. 5 is a closer view of a smaller portion of the crop protection netting than shown in FIG. 6a-6d, and in which three separate monofilament yarns or strands of the netting are shown each in a different shade.
Figure 6A:
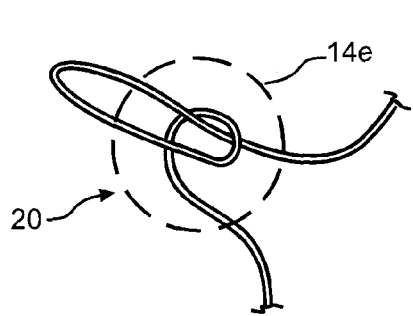
FIGS. 6a-c each show the path of one of the three yarns in an individual intersection in the netting.
Figure 6B:
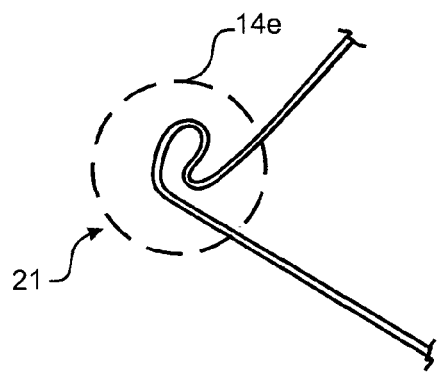
Figure 6C:
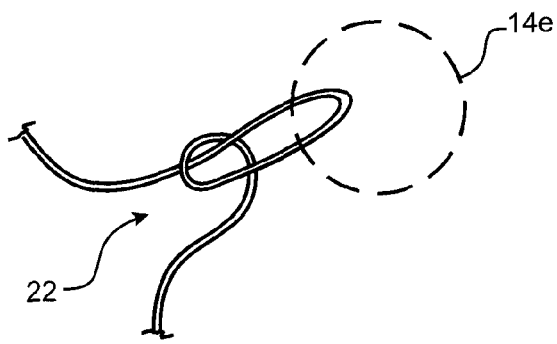
Figure 6D:
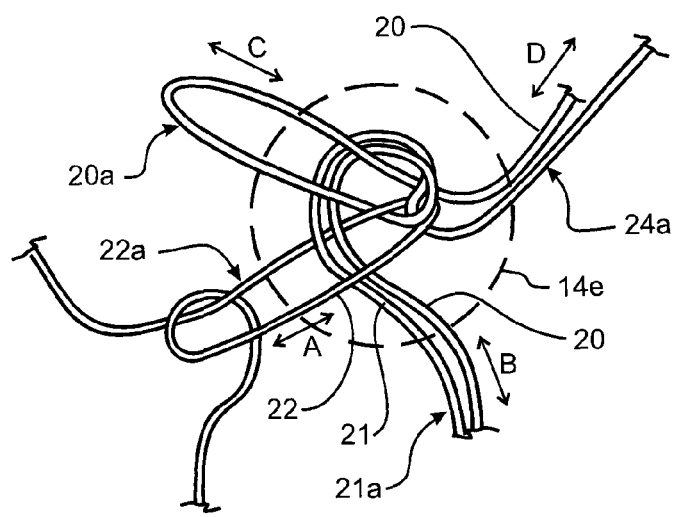
FIG. 6d shows enlarged an individual intersection, again with each yarn or strand shown in a different shade as in FIG. 5.

Referring now particularly to FIG. 5 which is a closer view of a small portion of the netting with three separate monofilament yarns or strands of the netting shown each in a different shade, and FIGS. 6a-c which each show the path of a one of the three yarns in an individual intersection in the netting and FIG. 6d which shows enlarged an individual intersection circled by a dashed line again with each yarn or strand shown in a different shade, each intersection is formed by knitting together of three yarn parts (of three yarns extending lengthwise beside each other) passing through the intersection:

a first yarn 22 which enters the intersection along a first axis A and exits the intersection along the same first axis, so that a first connecting portion 22a to a first adjacent intersection (of the four connecting portions to the intersection from four immediately adjacent and surrounding intersections) comprises adjacent lengths of the same yarn 22 a second yarn 20 which enters the intersection along a second axis B, passes through (and around) the loop within the intersection of the first yarn 22, and extends to and returns from a second adjacent intersection along a third axis C so that a second connecting portion 20a to that adjacent intersection comprises adjacent lengths of the same yarn 20, and exits the intersection along a fourth axis D, and a third yarn 21 which enters the intersection along second axis B so that a third connecting portion 21a from a third adjacent intersection comprises portions of both yarns 20 and 21, passes through the loop in the intersection of the first yarn 22, and exits the intersection along fourth axis D with yarn 20, so that a fourth connecting portion 24a to a fourth adjacent intersection comprises portions of both yarns 20 and 21.

Referring now particularly to FIG. 5.1 that is showing a variation on the knit pattern of FIG. 5, this variation has extra looping, which is a closer view of a small portion of the netting with three separate monofilament yarns or strands of the netting shown each in a different shade, and FIGS. 6.1a-c which each show the path of a one of the three yarns in an individual intersection in the netting and FIG. 6.1d which shows enlarged an individual intersection circled by a dashed line again with each yarn or strand shown in a different shade, each intersection is formed by knitting together of three yarn parts (of three yarns extending lengthwise beside each other) passing through the intersection:

a first yarn 122 which enters the intersection and does an extra loop before entering axis 1A, then extends along a first axis 1A and exits the intersection along the same first axis, so that a first connecting portion 122a to a first adjacent intersection (of the four connecting portions to the intersection from four immediately adjacent and surrounding intersections) comprises adjacent lengths of the same yarn 122 a second yarn 120 which enters the intersection along a second axis 1B, passes through (and around) the loop within the intersection of the first yarn 122, and then goes behind the loop created by the first yarn 122 to create an extra loop then extends to and returns from a second adjacent intersection along a third axis 1C so that a second connecting portion 120a to that adjacent intersection comprises adjacent lengths of the same yarn 120, and exits the intersection along a fourth axis 1D, and a third yarn 121 which enters the intersection along second axis 1B so that a third connecting portion 121a from a third adjacent intersection comprises portions of both yarns 120 and 121, passes through the loop in the intersection of the first yarn 122, and exits the intersection along fourth axis 1D with yarn 120, so that a fourth connecting portion 124a to a fourth adjacent intersection comprises portions of both yarns 120 and 121.

The extra looping in FIGS. 5.1 and 6.1 creates a similar net to FIGS. 5 and 6 but the extra looping gives a reduction in how stretchable the net is and this may in some applications be a more desired option. A plan view of FIGS. 5.1 and 6.1 is shown in FIG. 7.1.

Another feature of the netting construction of the preferred embodiment is that each yarn intersection in the netting is connected to adjacent and surrounding yarn intersections by the connecting yarn portions 14a-d each comprising at least two yarn lengths. In a preferred embodiment, each yarn intersection in the netting is connected to adjacent and surrounding yarn intersections by connecting yarn portions each comprising at least two yarn lengths that are at least free of knots or loops for 2 mm or more in length between the intersections.

This intersection knitting is repeated at each intersection in the netting. FIG. 5 shows the path of individual yarns in a larger portion of the netting. FIG. 7 shows a section of the material in which some individual yarns are shown in a contrasting colour from which it can be seen how individual yarns proceed down the length L of the material in the warp direction. Arrow L in FIG. 7 also indicates the machine or manufacturing direction. The many individual yarns all extend along the length of the netting and each yarn follows an approximate lengthwise zig-zag path path, looping at each intersection in the netting comprising the yarn to one side and then to another side so that is linked to the two adjacent pairs of yarns on both sides. Referring to FIG. 7 it can be seen that there is a pattern of zig-zags of two yarn parts, such as indicated at 30, between intersections 14e, with a loop, such as indicated at 31, to one side and then a loop, such as indicated at 32, to the other side, from successive intersections.

Netting of the invention may be formed from synthetic yarn of a polymer containing pigments which give the material desired properties, such as desired light reflective, absorptive and/or transmission properties for example. In some embodiments, the yarn may be reflective as previously described, for example by using yarns having a white pigment. This reflection may provide various benefits to the trees or plants being covered, but may also enhance the visibility of the netting to insects such as pollination insects thereby increasing the deterrence effect of the netting to insects. For example crop protection netting of the invention may be knitted from yarn which reflects at least 10% or at least 50% of solar radiation on average across the UV (wavelength about 280-400 nm), visible (wavelength about 400-700 nm) and very near infrared (wavelength about 700-800 nm) ranges, and which transmits at least 10% on average of solar radiation across the wavelength range about 800-2500 nm. In some embodiments the yarn may reflect more solar radiation than it transmits and absorbs in the LTV, visible, and very near infrared ranges. In some embodiments the yarn may transmit at least 15% or at least 20% of solar radiation on average in the wavelength range about 800-2500 nm. In some embodiments the yarn may reflect at least 10% on average of solar radiation across the wavelength range about 800-2500 nm. In some embodiments the yarn may be knitted from yarn from a resin comprising at least 4% or at least 8% or at least 10% or at least 12% or at least 14% or at least 16% or at least 18% or at least 20% or at least 25% by weight of at least one white pigment. In some embodiments white pigment comprises a zirconium, strontium, barium, magnesium, zinc, calcium, titanium, or potassium pigment or a combination thereof, such as zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, titanium dioxide, potassium oxide, potassium titanate or a combination thereof. The white pigment may be present in the form of particles of size 0.02-5 microns or 0.1-3 microns.

As stated the crop protection netting of the invention is particularly suitable covering trees or other plants for insect and bird exclusion. Particularly, the crop protection netting may be used over fruit trees including citrus trees to exclude insects that cause pollination in turn producing fruit with seeds. The netting is also stretchable so that as trees or plants covered by the netting grow the netting can stretch to accommodate growth. The netting also does not comprise a relatively high level of knotting in the netting construction, which can add weight to the netting which weight may undesirably bear on often delicate foliage of covered plants.

Trials

Figure 10:
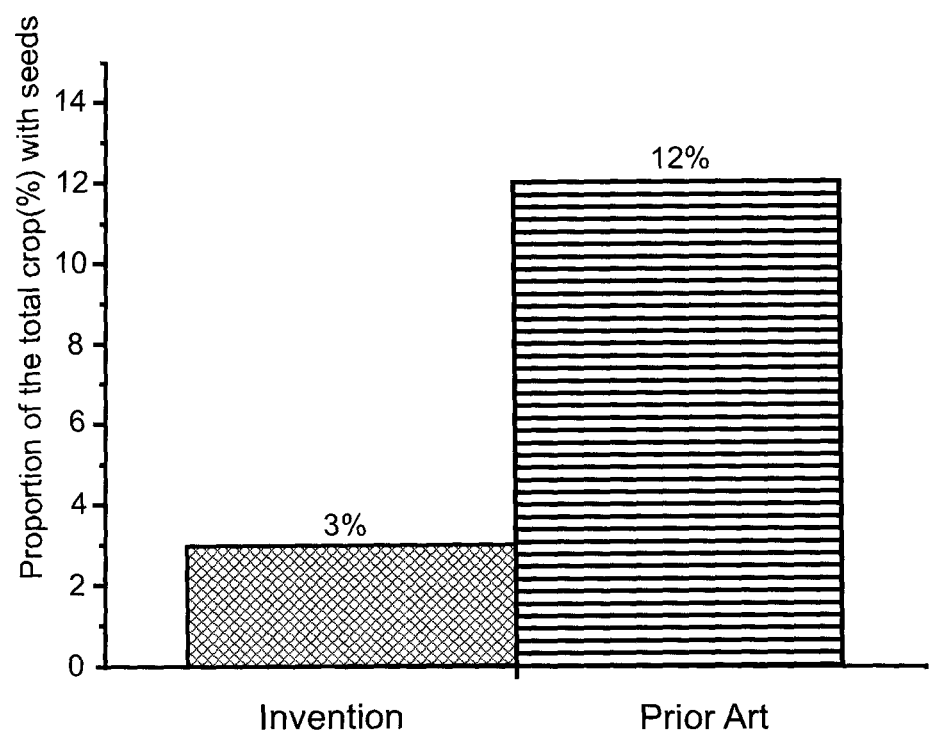
FIG. 10 is a plot of the results of comparative trials work comparing the performance of netting of FIGS. 3 to 6d to a standard pillar type construction insect deterrent netting of the type shown in FIG. 8, in the prevention of pollination during flowering and thus the production of seedless fruit.

The following description of trials work further illustrates the invention and in particular performance of netting of the preferred embodiment of the invention described above and illustrated in producing a higher proportion of seedless fruit than prior art insect deterrent netting. Clementine mandarins produce seedless fruit only if flowers are not pollinated prior to fruit set. The main mechanism of pollination for this variety is via bees. A study was undertaken in a mature Clementine mandarin block to assess the effectiveness of insect deterrent netting of the invention relative to a standard pillar type construction insect bee deterrent netting of the type shown in FIG. 8, in the prevention of pollination during flowering. Two adjacent rows of Clementine mandarin trees during the flowering period were covered one with a white coloured UV reflecting monofilament netting of the invention as described herein and illustrated in FIGS. 3 to 6 of mesh aperture size 4 mm and 200 denier (a mesh aperture size of 4×4 mm across the axes of the generally diagonal netting apertures) and the other with clear pillar netting as shown in FIG. 8 with 3×7 mm apertures. Both nettings were placed before the first flower was open and removed around 6 weeks later when the last flower had opened and set. At harvest 200 fruit from each row were assessed for the presence and number of fully formed seeds. Statistical analysis was carried out using general liners models analysis (NCSS software). The results are shown in FIG. 10. The trees covered with the netting of the invention produced significantly less fruit with one or more seeds than the trees covered with the standard pillar net—namely 3% vs 12%, $\alpha$=0.05.'

The foregoing description of the invention includes preferred forms thereof. Modifications may be made thereto without departing from the scope of the invention as defined in the accompanying claims.

The invention claimed is:

1. Crop protection netting comprising a greater length than width and which is of a knitted mesh construction, said knitted mesh construction knitted such that at yarn intersections in the netting multiple yarns of which the netting is formed are knitted around each other to define the netting mesh apertures and so that the netting is stretchable in length and width directions, said knitted mesh construction comprising connecting yarn portions between said yarn intersections, said connecting yarn portions extending substantially linearly between intersections, and each yarn intersection in the netting being connected to adjacent and surrounding yarn intersections by said connecting yarn portions, each of said connecting yarn portions comprising at least two yarn lengths that are free of knots or loops for at least 2 mm or more in length between the intersections and wherein the netting has a mesh size in the range 3 mm to 6 mm, the multiple yarns have a diameter up to 0.4 mm, and the netting has a weight up to 80 grams per m$^2$.

2. Crop protection netting according to claim 1 wherein the yarn intersections in immediately adjacent rows are staggered relative to each other.

3. Crop protection netting according to claim 1 wherein the netting is knitted from multiple yarns all extending along a length of the netting.

4. Crop protection netting according to claim 1 wherein in the netting each yarn follows an approximate zig-zag path along the length of the netting, looping at each intersection in the netting comprising the yarn, to a further netting yarn intersection one on one side and one on another side.

5. Crop protection netting according to claim 1 wherein each intersection is formed by knitting together of three yarn parts passing through the intersection:
   a first yarn which enters the intersection along a first axis and exits the intersection along the same first axis, so that a first connecting portion to a first adjacent intersection comprises adjacent lengths of the same yarn,
   a second yarn which enters the intersection along a second axis, passes through the loop within the intersection of the first yarn, and extends to and returns from a second adjacent intersection along a third axis so that a second connecting portion to that adjacent intersection comprises adjacent lengths of the same yarn, and exits the intersection along a fourth axis, and
   a third yarn which enters the intersection along the second axis so that a third connecting portion from a third adjacent intersection comprises portions of both the second and third yarns, passes through the loop in the intersection of the first yarn, and exits the intersection along fourth axis with the second yarn, so that a fourth connecting portion to a fourth adjacent intersection comprises portions of both the second and third yarns.

6. Crop protection netting according to claim 1 wherein each intersection is formed by knitting together of three yarn parts passing through the intersection:
   a first yarn which enters the intersection along a first axis, firstly creates an extra loop and exits the intersection along the same first axis, so that a first connecting portion to a first adjacent intersection comprises adjacent lengths of the same yarn,
   a second yarn which enters the intersection along a second axis, passes through the loop within the intersection of the first yarn, and then goes behind the loop created by the first yarn to create an extra loop and then extends to and returns from a second adjacent intersection along a third axis so that a second connecting portion to that adjacent intersection comprises adjacent lengths of the same yarn, and exits the intersection along a fourth axis, and
   a third yarn which enters the intersection along the second axis so that a third connecting portion from a third adjacent intersection comprises portions of both the second and third yarns, passes through the loop in the intersection of the first yarn, and exits the intersection along fourth axis with the second yarn, so that a fourth connecting portion to a fourth adjacent intersection comprises portions of both the second and third yarns.

7. Crop protection netting according to claim 1 wherein each mesh aperture is defined substantially by the knitted yarn on four sides between four looped or knotted knit intersections.

8. Crop protection netting according to claim 1 formed from elastic yarn.

9. Crop protection netting according to claim 1 formed from monofilament yarn.

10. Crop protection netting according to claim 1 formed from twin or multiple filament yarn.

11. Crop protection netting according to claim 1 wherein the yarn has a weight in the range of approximately 50 to 1000 denier.

12. Crop protection netting according to claim 1 which has been produced on a warp knitting machine.

13. Crop protection netting according to claim 1 which is white in colour.

14. A crop protection netting according to claim 1 which is knitted from yarn which reflects at least 30% solar radiation on average across the UV (wavelength about 280-400 nm).

15. Crop protection netting according to claim 1 comprising a cover factor of less than 30%.

16. Crop protection netting according to claim 1 which is knitted from yarn from a resin comprising at least 4% by weight of at least one white pigment.

17. Crop protection netting according to claim 1 wherein the netting is knitted from multiple yarns all extending along a length of the netting.

18. Crop protection netting according to claim 1 wherein the multiple yarns from which the netting is formed comprise a combination of monofilament or twin or multiple filament yarn, and tape.

19. Crop protection netting according to claim 1 which has a weight up to 60 grams per m$^2$.

20. Crop protection netting according to claim 1 which is transparent or translucent.

21. A method which includes supporting over one or more plant(s) as a canopy protection netting according to claim 1.

22. Crop protection netting comprising a knitted mesh construction which is stretchable in multiple directions, said knitted mesh construction comprising connecting yarn portions between knitted yarn intersections which extend substantially linearly between the yarn intersections, and are free of knots or loops between the intersections said knitted mesh construction being knitted from multiple yarn, and wherein said connecting yarn portions between said knitted yarn intersections each comprise at least two yarn lengths, and wherein the netting has a mesh size in the range of approximately 2 mm to 10 mm, the multiple yarns have a diameter in the range of approximately 0.1 mm to 1 mm, and the netting has a weight in the range approximately 10 to 100 grams per m$^2$.

* * * * *